United States Patent
Pasolini et al.

(10) Patent No.: US 8,875,573 B2
(45) Date of Patent: *Nov. 4, 2014

(54) INERTIAL DEVICE WITH PEDOMETER FUNCTION AND PORTABLE ELECTRIC APPLIANCE INCORPORATING SAID INERTIAL DEVICE

(75) Inventors: Fabio Pasolini, San Martino Siccomario (IT); Michele Tronconi, San Martino Siccomario (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 470 days.

This patent is subject to a terminal disclaimer.

(21) Appl. No.: 13/176,675

(22) Filed: Jul. 5, 2011

(65) Prior Publication Data

US 2011/0264407 A1 Oct. 27, 2011

Related U.S. Application Data

(63) Continuation of application No. 11/669,096, filed on Jan. 30, 2007, now Pat. No. 8,042,390.

(30) Foreign Application Priority Data

Jan. 30, 2006 (EP) .................................. 06425041

(51) Int. Cl.
*G01P 15/00* (2006.01)
*G01C 22/00* (2006.01)

(52) U.S. Cl.
CPC .................................. *G01C 22/006* (2013.01)
USPC ........................................... 73/489; 702/160

(58) Field of Classification Search
USPC ............ 73/493, 489–492; 702/160, 176, 178, 702/141, 150–154, 158
See application file for complete search history.

(56) References Cited

U.S. PATENT DOCUMENTS

| 5,426,595 A | 6/1995 | Picard ........................... 364/569 |
| 6,052,654 A | 4/2000 | Gaudet et al. ................. 702/160 |

(Continued)

FOREIGN PATENT DOCUMENTS

| JP | 2001-272413 A | 10/2001 |
| JP | 2004-081274 A | 3/2004 |
| JP | 2005-033524 A | 2/2005 |
| JP | 2005-286809 A | 10/2005 |

OTHER PUBLICATIONS

"Precision ± 1.7 g, Single/Dual Axis Accelerometer" Analog Devices, ADXL 103/ADXL203, Rev. 0, 12 pages, 2004.

(Continued)

*Primary Examiner* — Helen Kwok
(74) *Attorney, Agent, or Firm* — Seed IP Law Group PLLC

(57) ABSTRACT

An inertial device that is integratable in a portable electronic device includes: an inertial sensor for generating at least one raw acceleration signal in response to accelerations caused by movements of walking and running of a user of the pedometer; and a processing unit, associated to the inertial sensor for counting a number of steps of the user of the pedometer on the basis of the raw acceleration signal. The inertial sensor and the processing unit are both encapsulated within a single package for integrated circuits, which can be coupled to a circuit board of an electronic device and is provided with at least one connection terminal for making the number of steps available to the outside world.

20 Claims, 6 Drawing Sheets

(56) References Cited

U.S. PATENT DOCUMENTS

| | | | |
|---|---|---|---|
| 6,135,951 A | 10/2000 | Richardson et al. | 600/300 |
| 6,145,389 A | 11/2000 | Ebeling et al. | 73/865.4 |
| 6,546,336 B1 | 4/2003 | Matsuoka et al. | 701/213 |
| 6,891,239 B2 * | 5/2005 | Anderson et al. | 257/414 |
| 6,898,550 B1 | 5/2005 | Blackadar et al. | 702/182 |
| 7,040,922 B2 * | 5/2006 | Harney et al. | 439/527 |
| 7,463,997 B2 | 12/2008 | Pasolini et al. | 702/160 |
| 7,578,184 B2 * | 8/2009 | Fontanella et al. | 73/488 |
| 7,672,806 B2 | 3/2010 | Tronconi et al. | 702/141 |
| 7,698,097 B2 | 4/2010 | Pasolini et al. | 702/160 |
| 8,042,390 B2 * | 10/2011 | Pasolini et al. | 73/489 |

OTHER PUBLICATIONS

"Small, Low Power, 3-Axis ±3 g, iMEMS® Accelerometer" Analog Devices, ADXL330, Rev. A, 16 pages, 2006.

\* cited by examiner

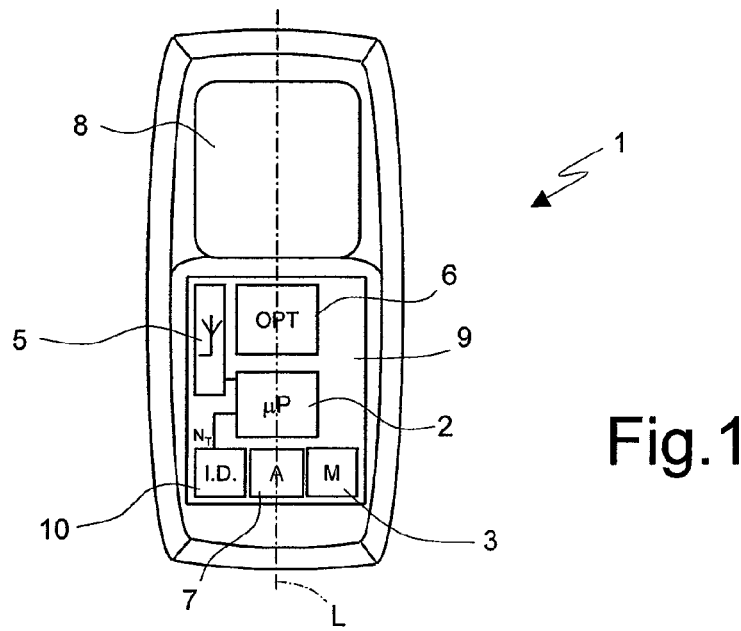
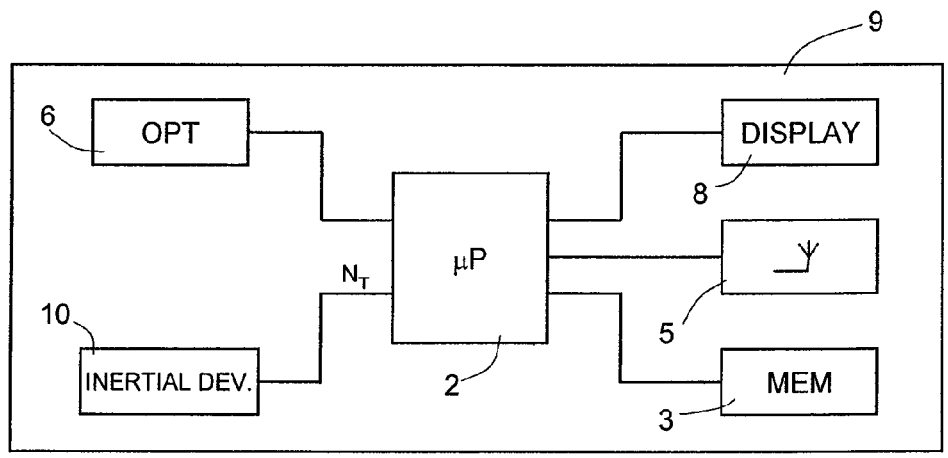
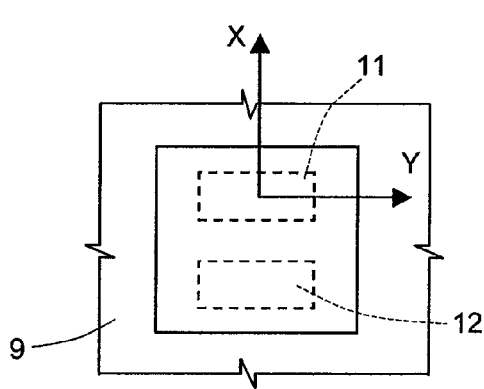
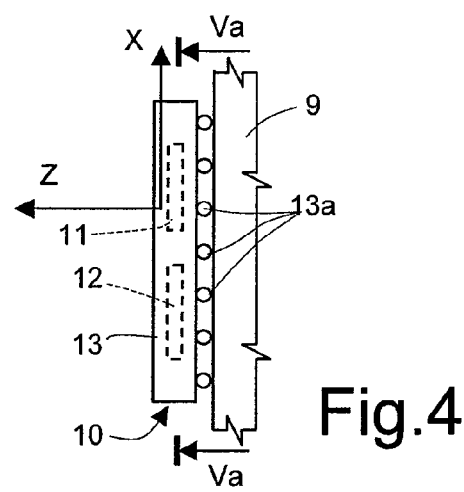
Fig.1
Fig.2
Fig.3
Fig.4

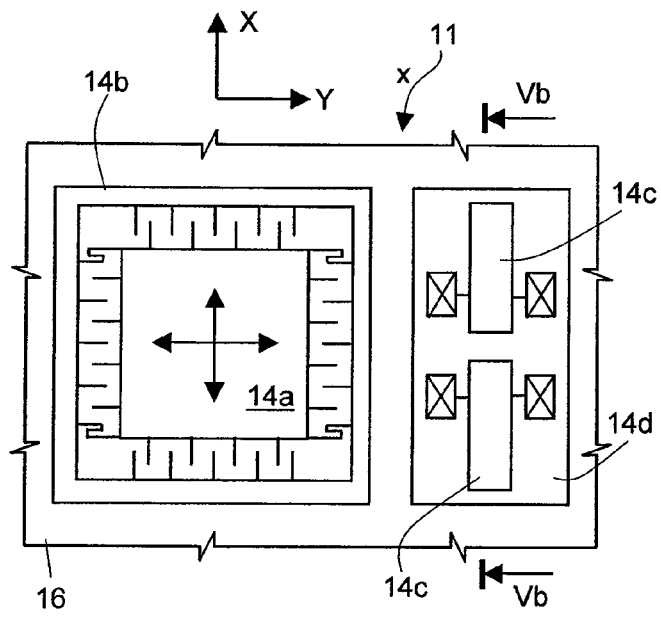 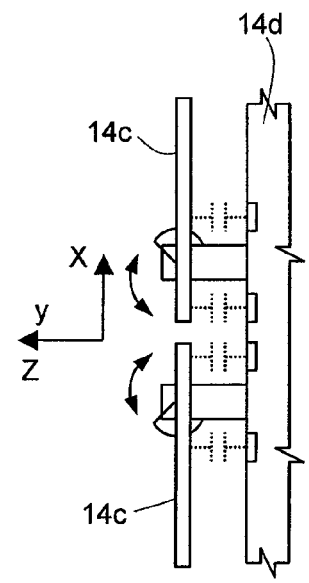
Fig.5a   Fig.5b
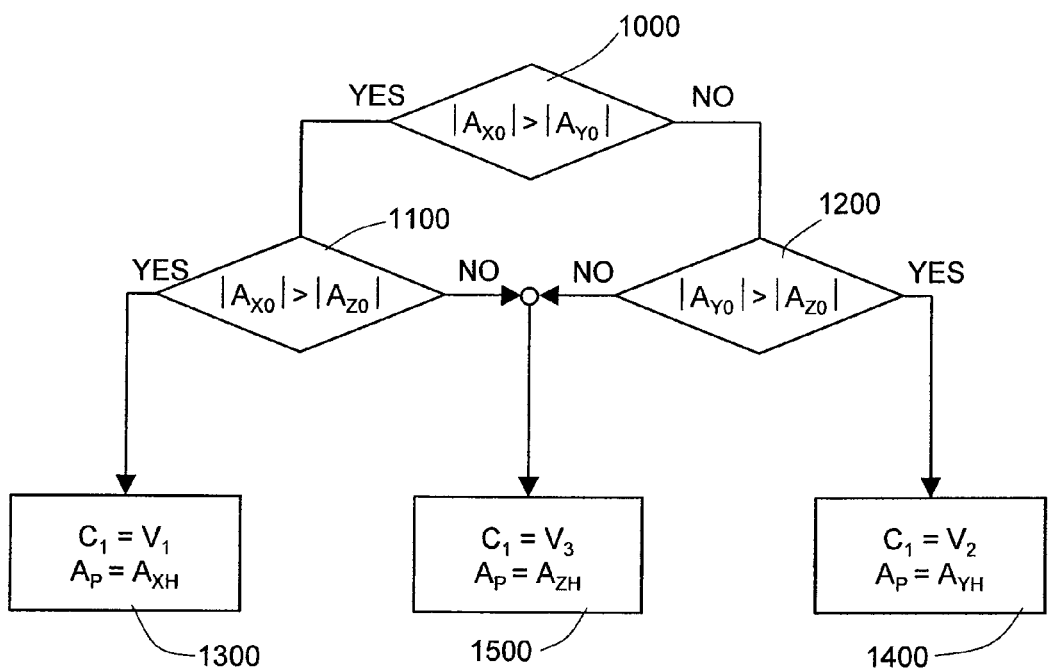
Fig.8

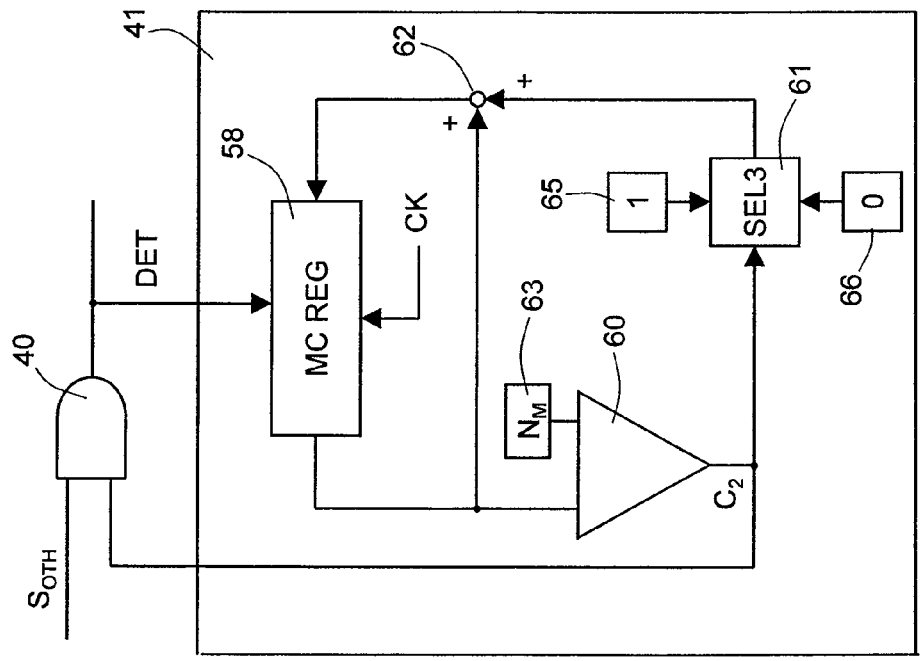
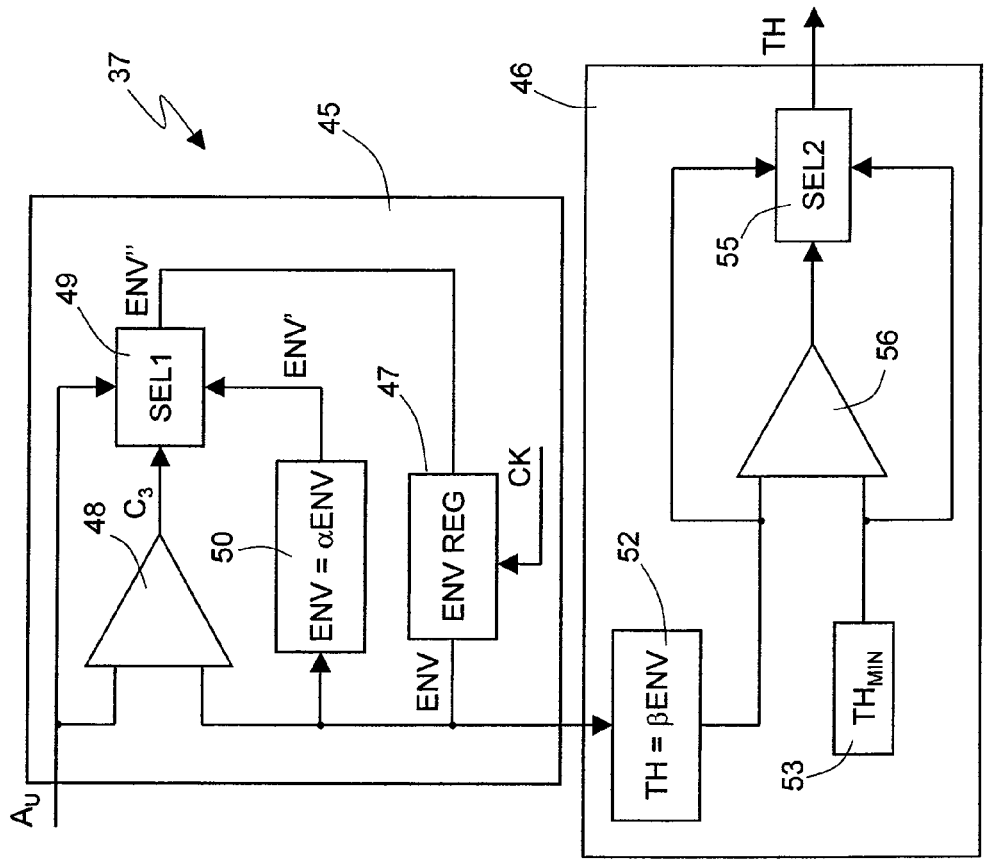
Fig. 11
Fig. 10

INERTIAL DEVICE WITH PEDOMETER FUNCTION AND PORTABLE ELECTRIC APPLIANCE INCORPORATING SAID INERTIAL DEVICE

CROSS-REFERENCE TO RELATED APPLICATIONS

This application is a continuation of U.S. patent application Ser. No. 11/669,096, filed Jan. 30, 2007, which is incorporated herein by reference, in its entirety.

BACKGROUND OF THE INVENTION

1. Field of the Invention

The present invention relates to an inertial device with pedometer function and to a portable electric appliance incorporating said inertial device.

2. Description of the Related Art

As is known, a pedometer is a device that can be worn by a user and has the function of counting the number of steps during various forms of walking or running, for consequently estimating the distance covered. The indications provided are useful both for quantifying the motor activity performed by an individual in the course of a given period, for example for clinical purposes, and for evaluating performance in sport or even just for personal interest. Basically, a pedometer comprises a movement sensor, for detecting movements due to walking of a user, a control unit, which processes signals supplied by the movement sensor for counting the number of steps made, and a display, on which the important information is displayed. The elements that make up the pedometer are generally assembled on a board, which is in turn housed in a casing.

The growing interest for pedometers, the modest dimensions, and the relatively contained production cost have pushed manufacturers of different portable electronic devices to integrate in their own products also the pedometer function. In particular, some portable electronic devices are very well suited to integration of a pedometer, because they already comprise, for other purposes, some pedometer components. For example, cell phones and palmtops are always provided with a microprocessor that performs numerous control functions. Increasingly frequently, moreover, the same devices also include an inertial sensor, which, among other things, can be used for the purpose of detecting and recording traumatic events, such as impact and falls, or else for detecting states of prolonged rest, in which the devices are presumably unused and can be set in a low-consumption wait state or stand-by mode.

The integration of a pedometer poses, however, some problems. In fact, the procedures used for counting the steps become progressively more sophisticated and require a growing processing capacity, also because they are continuously executed for prolonged periods. For instance, the signal coming from the movement sensor is filtered and subjected to further processing to prevent events not correlated to walking from falsifying counting of the steps. On the other hand, the microprocessor executes the majority of the functions envisaged for the portable device, in addition to serving as control unit of the pedometer. Conflicts may thus arise, especially when the microprocessor is intensively exploited for other reasons (for example, for the reproduction of a digital film).

BRIEF SUMMARY OF THE INVENTION

One embodiment of the present invention is an inertial device with pedometer function and a portable electronic appliance that enable the limitations described above to be overcome.

One embodiment of the present invention is an inertial device with pedometer function.

BRIEF DESCRIPTION OF THE SEVERAL VIEWS OF THE DRAWINGS

For a better understanding of the invention, there are now described some embodiments thereof, purely by way of non-limiting example and with reference to the attached drawings, wherein:

FIG. 1 shows a simplified and partially sectioned front view of a portable electronic appliance incorporating an inertial device with pedometer function provided in accordance with a first embodiment of the present invention;

FIG. 2 shows a block diagram of the portable electronic appliance of FIG. 1;

FIG. 3 is an enlarged front view of the inertial device of FIG. 1;

FIG. 4 is an enlarged right side view of the inertial device of FIG. 1;

FIG. 5a is a front view of a part of the inertial device of FIG. 1, further enlarged and sectioned along the line Va-Va of FIG. 4;

FIG. 5b is a cross section through the inertial device of FIG. 1, taken along the line Vb-Vb of FIG. 5a;

FIG. 8 is a flowchart regarding a procedure executed by the first circuit of FIG. 7;

FIG. 10 is a more detailed block diagram of a first part of the second circuit of FIG. 9;

FIG. 11 is a more detailed diagram of a second part of the second circuit of FIG. 9.

DETAILED DESCRIPTION OF THE INVENTION

Figure 6:
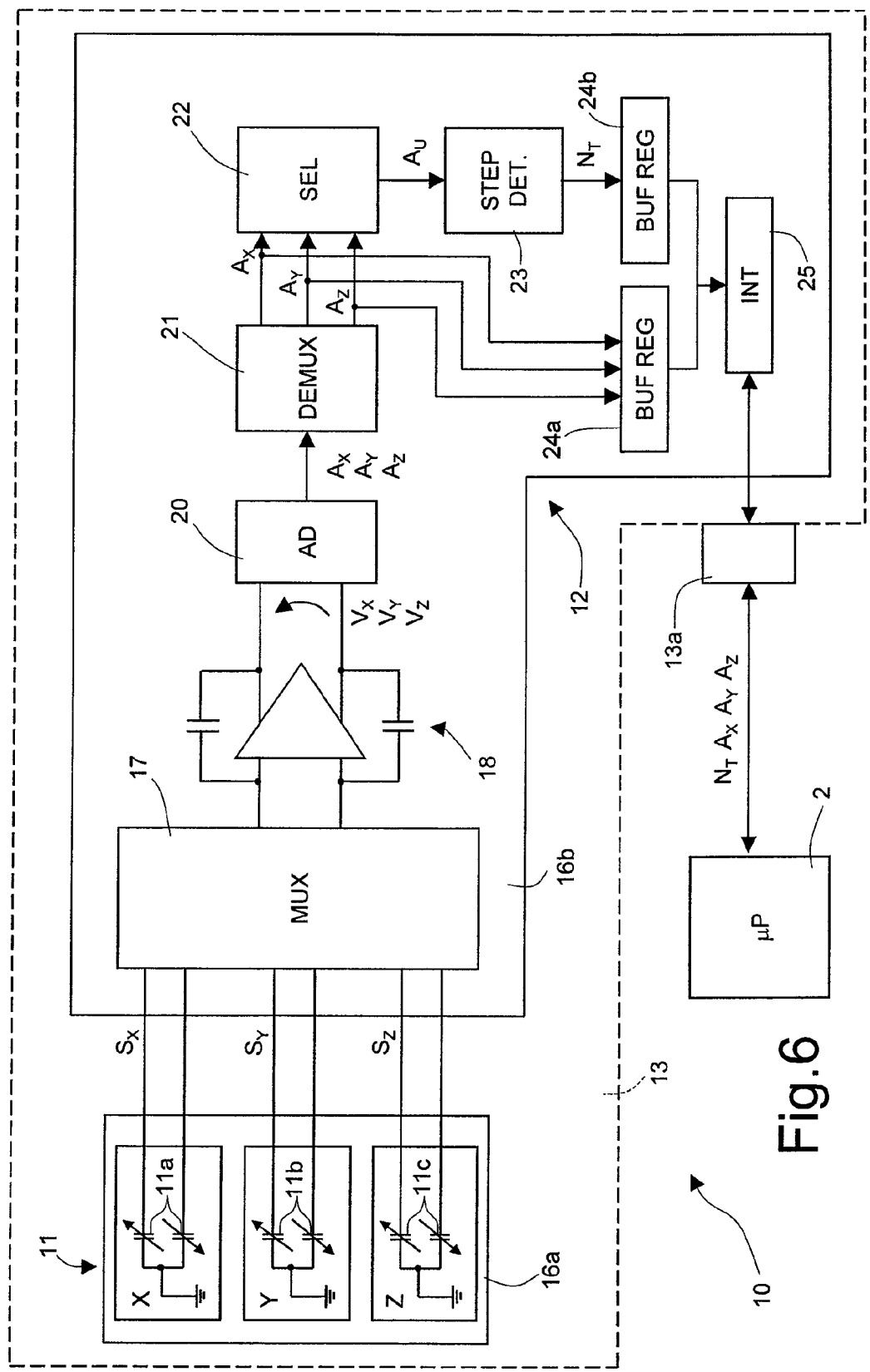
FIG. 6 is a simplified block diagram of the inertial device of FIG. 1.

With reference to FIGS. 1 and 2, a portable electronic appliance, herein a cell phone 1, comprises: a microprocessor 2; volatile and not volatile memory banks 3; a receiving/transmitting circuit 5; an image sensor 6, coupled in a known way to optics (herein not illustrated); and a display 8. The components listed above are mounted on a circuit board 9 (not necessarily on one and the same face of the latter) and are connected to one another in a known way for providing conventional functions in cell phones. The circuit board 9, which has a longitudinal axis L, is in turn housed within a casing 4 of the cell phone 1.

Furthermore, the cell phone 1 incorporates an inertial device 10, which is also connected to the microprocessor 2 and selectively activatable by the latter. When active, the inertial device 10 supplies to the microprocessor 2 a first numeric acceleration signal $A_X$, a second numeric acceleration signal $A_Y$, and a third numeric acceleration signal $A_Z$ (as explained in detail hereinafter), in a numeric format that is directly usable by the microprocessor 2 itself. The inertial device 10 is moreover configured to operate autonomously as pedometer, counts a total number of steps $N_T$ of a user, and supplies it to the microprocessor 2, once again in the same numeric format. Preferably, the inertial device 10 can generate internally and supply to the microprocessor 2 also other data regarding the gait of the user, such as, for example, an estimated speed, a total distance covered, an estimated energy consumption, and the like.

The inertial device 10 includes an inertial sensor 11 and a processing unit 12, both encapsulated within a single package 13 for integrated circuits, as illustrated in FIGS. 3 and 4. The package 13 is preferably of the BGA ("Ball Grid Array") or LGA ("Land Grid Array") type and is soldered on the circuit board 9, herein by means of bumpers, which function as connection terminals 13a (FIG. 4) for coupling the inertial device 10 to the other components of the cell phone 1 (in particular, to the microprocessor 2).

The inertial sensor 11 is preferably of the capacitive microelectromechanical (or MEMS, Micro-Electro-Mechanical System) type, having a first detection axis X, a second detection axis Y, and a third detection axis Z, which are mutually perpendicular and independent. When the inertial sensor 11 is mounted on the board 9, the first detection axis X is parallel to the longitudinal axis L of the board 9, the second detection axis Y is parallel to the surface of the board 9 and perpendicular to the first detection axis X, and the third detection axis Z is perpendicular to the other two axes. The inertial sensor 11 comprises microelectromechanical structures having movable parts elastically constrained to fixed parts. In the embodiment described herein, in particular, the sensor 11 comprises: a biaxial linear accelerometer with comb-fingered electrodes (FIG. 5a), having a movable mass 14a translatable along the first axis X and the second axis Y with respect to a fixed body 14b; and a single-axis accelerometer (see also FIG. 5b) with hinged beams 14c oscillating with respect to a fixed body 14d, for detecting accelerations along the third detection axis Z. In this way, the inertial sensor 11 can advantageously be provided in a single first semiconductor chip 16a (see also FIG. 6).

With reference to FIG. 6, the movable parts and the fixed parts of the inertial sensor 11 define a first pair of capacitors 11a, a second pair of capacitors 11b, and a third pair of capacitors 11c having variable capacitance in response to forces and accelerations acting on the inertial sensor 11, respectively, along the first, second and third detection axes X, Y, Z. The capacitance variations of the first, second, and third pairs of capacitors 11a, 11b, 11c are moreover of a differential type.

The inertial sensor 11 supplies to the control unit a first raw acceleration signal $S_X$, a second raw acceleration signal $S_Y$, and a third raw acceleration signal $S_Z$, respectively, determined by the capacitance variations of the first, second, and third pairs of capacitors 11a, 11b, 11c and hence correlated to the accelerations detected, respectively, along the first, second, and third detection axes X, Y, Z. In the embodiment described herein, the first, second, and third raw acceleration signals $S_X$, $S_Y$, $S_Z$ are in the form of charge packets, which are transferred independently from the first, second, and third pairs of capacitors 11a, 11b, 11c to respective inputs of the processing unit 12.

The processing unit 12 is provided in a single second semiconductor chip 16b, obviously separate from the microprocessor 2, and is configured so as to execute a counting procedure of the steps based upon the first, second, and third raw acceleration signals $S_X$, $S_Y$, $S_Z$, previously processed, as explained hereinafter.

In detail (FIG. 6), the processing unit 12 comprises a multiplexer 17, a charge integrator 18, an analog-to-digital (A/D) converter 20, a demultiplexer 21, a selection circuit 22, a detection circuit 23, a first buffer register 24a and a second buffer register 24b, and a communication interface 25. In the embodiment of the invention herein described, all the functions performed by the processing unit 12 are provided completely in hardware, i.e., by means of respective dedicated analog or digital circuits.

The charge integrator 18, which functions as reading interface of the inertial sensor 11, is a charge-voltage converter and includes a fully differential operational amplifier, the inputs whereof are cyclically connected to the first, second, and third pairs of capacitors 11a, 11b, 11c through the multiplexer 17. Consequently, the charge integrator 18 is used in time-division for converting the first, second, and third raw acceleration signals $S_X$, $S_Y$, $S_Z$ cyclically into a first voltage $V_X$, a second voltage $V_Y$, and a third voltage $V_Z$, of an analog type.

The outputs of the charge amplifier 18 are connected to the A/D converter 20 that samples the first, second, and third voltages $V_X$, $V_Y$, $V_Z$, for generating, respectively, the first, second, and third numeric acceleration signals $A_X$, $A_Y$, $A_Z$. The sequential output of the A/D converter 20 is connected to the demultiplexer 21, which supplies the first, second, and third numeric acceleration signals $A_X$, $A_Y$, $A_Z$ to the selection circuit 22 in parallel over three independent lines. The first, second, and third numeric acceleration signals $A_X$, $A_Y$, $A_Z$ are also loaded in the first buffer register 24a so as to be made available to the microprocessor 2.

The selection circuit 22 and the detection circuit 23 process the first, second, and third numeric acceleration signals $A_X$, $A_Y$, $A_Z$, as explained hereinafter for detecting events identifiable as user's steps and for updating the total number of steps $N_T$. The output of the detection circuit 23 is connected to the second buffer register 24b, where the total number of steps $N_T$ is temporarily stored and made available to the outside to be sent to the microprocessor 2 through the communication interface 25 and a connection terminal 13a of the package 13.

Figure 7:
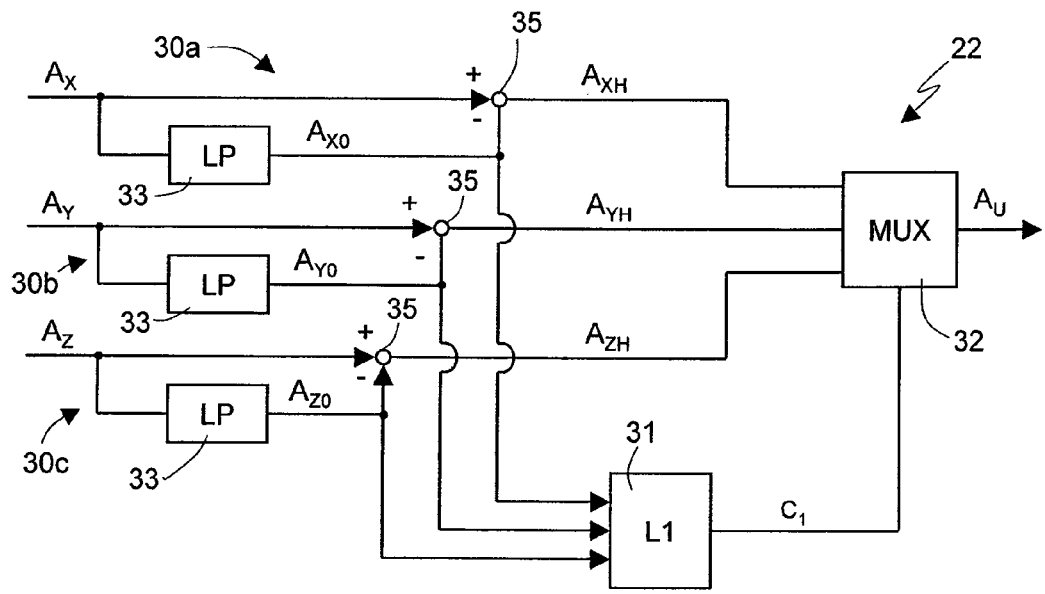
FIG. 7 is a more detailed block diagram of a first circuit included in the inertial device of FIG. 1.

As illustrated in FIG. 7, the selection circuit 22 receives from the demultiplexer 21 the first, second, and third numeric acceleration signals $A_X$, $A_Y$, $A_Z$ and generates a usable acceleration signal $A_U$, which corresponds substantially to the a.c. component of one from among the first, second, and third numeric acceleration signals $A_X$, $A_Y$, $A_Z$ and precisely that having the largest d.c. component in absolute value. In greater detail, the selection circuit 22 comprises a first processing line 30a, a second processing line 30b, and a third processing line 30c, a first logic circuit 31, and a multiplexer 32. The first, second, and third processing lines 30a, 30b, 30c each comprise a respective lowpass filter 33 and a respective subtractor node 35. More precisely, the lowpass filters 33 of the first, second, and third processing lines 30a, 30b, 30c receive, respectively, the first, second, and third numeric acceleration signals $A_X$, $A_Y$, $A_Z$ at their inputs and have outputs connected to negative inputs of the respective subtractor nodes 35 and, moreover, to respective inputs of the first logic circuit 31. The lowpass filters 33 are configured so as to extract substantially respective d.c. components $A_{X0}$, $A_{Y0}$, $A_{Z0}$ of the first, second, and third numeric acceleration signals $A_X$, $A_Y$, $A_Z$. The first, second, and third numeric acceleration signals $A_X$, $A_Y$, $A_Z$ are moreover directly supplied to positive inputs of the subtractor nodes 35, respectively, of the first, second, and third processing lines 30a, 30b, 30c. On the outputs of the subtractor nodes 35 there are thus a.c. components $A_{XH}$, $A_{YH}$, $A_{ZH}$, respectively, of the first, second, and third numeric acceleration signals $A_X$, $A_Y$, $A_Z$ ($A_{XH}=A_X-A_{X0}$; $A_{YH}=A_Y-A_{Y0}$; $A_{ZH}=A_Z-A_Z$). Furthermore, the outputs of the subtractor nodes 35 are connected to respective data inputs of the multiplexer 32, which has a further selection input, connected to the output of the first logic circuit 31 for receiving a first control signal $C_1$. The output of the multiplexer 32 supplies the usable acceleration signal $A_U$.

The first logic circuit 31 controls the multiplexer 32 by means of the first control signal $C_1$ so that the usable acceleration signal $A_U$ on the output of the multiplexer 32 corresponds to the a.c. component $A_{XH}$, $A_{YH}$, $A_{ZH}$ of that signal between the first, second, and third numeric acceleration signals $A_X$, $A_Y$, $A_Z$ that has the d.c. largest component $A_{X0}$, $A_{Y0}$, $A_{Z0}$ in absolute value. In this way, in practice, there is always used the acceleration signal corresponding to the detection axis nearest to the vertical and hence most sensitive to the accelerations caused by walking of the user (in fact, the d.c. component of the acceleration signal associated to a detection axis of a generic inertial sensor is basically determined by the contribution of the acceleration of gravity along that axis). The multiplexer 17, the charge integrator 18, the A/D converter 20, the demultiplexer 21, and the selection circuit 22 form in practice a conversion chain that extracts the usable acceleration signal $A_U$ starting from the first, second, and third raw acceleration signals $S_X$, $S_Y$, $S_Z$.

In greater detail, the first logic circuit 31 executes the procedure illustrated in FIG. 8. Initially, the numeric acceleration signal $A_X$, $A_Y$, $A_Z$ that has the largest d.c. component in absolute value is selected. For this purpose, the absolute value of the d.c. component $A_{X0}$ of the first numeric acceleration signal $A_X$ is compared with the absolute value of the d.c. component $A_{Y0}$ of the second numeric acceleration signal $A_Y$ (block 1000, test: "$|A_{X0}|>|A_{Y0}|$?"). Thus, the largest d.c. component $A_{X0}$, $A_{Y0}$ in absolute value is compared with the absolute value of the d.c. component $A_{Z0}$ of the third numeric acceleration signal $A_Z$ (output YES from block 1000 and block 1100, if $|A_{X0}|>|A_{Y0}|$, test: "$|A_{X0}|>|A_{Z0}|$?"; output NO from block 1000 and block 1200, if $|A_{X0}|<|A_{Y0}|$, test: "$|A_{Y0}|>|A_{Z0}|$?").

According to whether the d.c. component $A_{X0}$ of the first numeric acceleration signal $A_X$, the d.c. component $A_{Y0}$ of the second numeric acceleration signal $A_Y$, or the d.c. component $A_{Z0}$ of the third numeric acceleration signal $A_Z$ is the largest in absolute value, a first value $V_1$ (block 1300), a second value $V_2$ (block 1400), or a third value $V_3$ is respectively assigned to the control signal $C_1$ (block 1500). In the first case ($C_1 = V_1$), the multiplexer 32 is controlled so as to connect its output to the subtractor node 35 of the first processing line 30a; hence, the usable acceleration signal $A_U$ is equal to the a.c. component $A_{XH}$ of the first numeric acceleration signal $A_X$ ($A_U = A_{XH}$). In the second case ($C_1 = V_2$), the multiplexer 32 is controlled so as to connect its output to the subtractor node 35 of the second processing line 30b; hence, the usable acceleration signal $A_U$ is equal to the a.c. component $A_{YH}$ of the second numeric acceleration signal $A_Y$ ($A_U = A_{YH}$). In the third case ($C_1 = V_3$), the multiplexer 32 is controlled so as to connect its output to the subtractor node 35 of the third processing line 30c; hence, the usable acceleration signal $A_U$ is equal to the a.c. component $A_{ZH}$ of the third numeric acceleration signal $A_Z$ ($A_U = A_{ZH}$).

Figure 9:
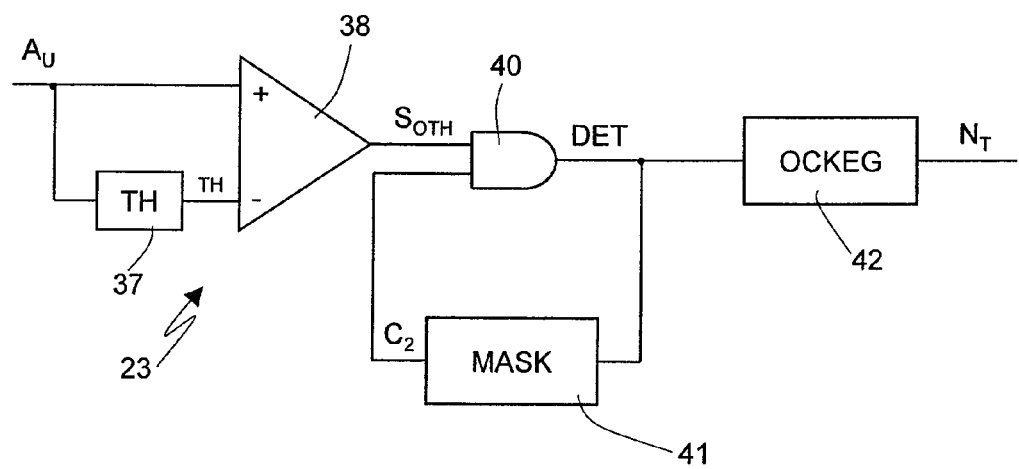
FIG. 9 is a more detailed block diagram of a second circuit included in the inertial device of FIG. 1.

With reference to FIG. 9, the detection circuit 23 uses the usable acceleration signal $A_U$ to identify waveforms corresponding to patterns associated to a step of the user and, whenever a step is detected, increments the total number of steps $N_T$.

In detail, the detection circuit 23 comprises a threshold-updating circuit 37, a comparator 38, an enabling gate 40, a masking circuit 41, and an output counter register 42. The comparator 38 receives the usable acceleration signal $A_U$ on a non-inverting input and a threshold value TH on an inverting input. The threshold value TH is generated by the threshold-updating circuit 37 on the basis of the usable acceleration signal $A_U$, supplied to its input. The output of the comparator 38 is connected to an input of the enabling gate 40 (herein an AND type logic gate) and supplies a threshold-exceeding signal $S_{OTH}$ of a logic type, having a first value when the usable acceleration signal $A_U$ is greater than the threshold value TH, and a second value otherwise. The enabling gate 40 has a further input connected to an output of the masking circuit 41 and an output connected to a counting input of the output counter register 42 and to an input of the masking circuit 41. A step-detection signal DET is present on the output of the enabling gate 40. The output counter register 42 contains the total number of steps $N_T$, and its output forms the output of the detection circuit 23. As explained hereinafter, the masking circuit 41 generates a second control signal $C_2$ on the basis of the step-detection signal DET. The second control signal $C_2$ is supplied to the enabling gate 40 and has an enabling value, which enables the transfer of the threshold-exceeding signal $S_{OTH}$ on the output of the enabling gate 40, and a disabling value, which blocks the disabling gate 40.

The detection circuit 23 operates in the way described hereinafter. The usable acceleration signal $A_U$ is normally lower than the threshold value TH and exceeds it upon setting the foot down to ground, when the user is walking or running. Fundamentally, then, a step of the user is detected when the usable acceleration signal $A_U$ exceeds the threshold value TH. When this occurs, the threshold-exceeding signal $S_{OTH}$ switches, and its value is transferred onto the output of the enabling gate 40 (the second control signal $C_2$ normally has the enabling value). Also the step-detection signal DET is enabled to switch to a detection value and increments the content of the output counter register, i.e., the total number of steps $N_T$. However, as soon as the step-detection signal DET switches to the detection value, the masking circuit 41 sends the second control signal $C_2$ to the disabling value and blocks the enabling gate 40 for a masking time interval of predetermined duration. In practice, the enabling gate 40 and the masking circuit 41 selectively enable updating of the total number of steps $N_T$ contained in the output counter register 42, when the usable acceleration signal $A_U$ is lower than the threshold value TH, and disable it temporarily for the duration of the masking interval, following upon exceeding of the threshold value TH by the usable acceleration signal $A_U$. In the masking interval, then, the detection of further steps is inhibited in order to prevent false counts.

FIG. 10 illustrates in detail the threshold-updating circuit 37, which comprises an envelope detector 45 and a threshold-calculation stage 46.

In the embodiment described, the envelope detector 45 comprises an envelope register 47, an envelope comparator 48, a first selector circuit 49, and a first multiplier circuit 50. The envelope register 47 is timed in a known way by a clock signal CK and, at each cycle of the clock signal CK, supplies on its output a (numeric) current envelope value ENV of the usable acceleration signal $A_U$. The envelope comparator 48 receives on its inputs the usable acceleration signal $A_U$ and the current envelope value ENV and generates a third control signal $C_3$, of a logic type, which is supplied to a control input of the first selector circuit 49. On respective data inputs, the first selector circuit 48 receives the usable acceleration signal $A_U$ and an attenuated envelope value ENV' generated by the first multiplier circuit 50. In practice, the first multiplier circuit 50 receives the current envelope value ENV from the envelope register 47 and multiplies it by an attenuation factor (smaller than 1). The output of the first selector circuit 50 supplies an updated envelope value ENV", which is stored in the envelope register 47 at a subsequent cycle of the clock signal CK. The first selector circuit 48 is controlled by the envelope comparator 48 so that the updated envelope value ENV" is equal to the usable acceleration signal $A_U$, if the latter is greater than the current envelope value ENV, and equal to the attenuated envelope value ENV' otherwise.

The threshold-calculation stage 46 comprises: a second multiplier circuit 52, which receives the current envelope value ENV from the envelope register 47 and supplies a threshold value TH equal to a fraction of the current envelope value ENV itself; a minimum-threshold register 53, in which a minimum threshold value $TH_{MIN}$ is stored; a second selector circuit 55, having data inputs connected to the outputs of the second multiplier circuit 52 and of the minimum-threshold register 53; and a threshold comparator 56, which also has inputs connected to the outputs of the second multiplier circuit 52 and of the minimum-threshold register 53 and an output connected to a control input of the second selector circuit 55. In practice, the threshold comparator 56 controls the second selector circuit 55 so that the threshold value on its output is equal to the higher between the threshold value TH and the minimum threshold value $TH_{MIN}$. Consequently, the threshold value TH is adapted on the basis of the envelope of the usable acceleration signal $A_U$, but is never brought below the minimum threshold value $TH_{MIN}$.

Illustrated in FIG. 11, is a diagram with a detail of the masking circuit 41, which, in the embodiment of the invention described herein, comprises a masking counter register 58, a masking comparator 60, a third selector circuit 61, and an adder node 62. A reset input of the masking counter register 58 is connected to the output of the enabling gate 40 for receiving the step-detection signal DET. A timing input receives instead the clock signal CK. The output of the masking counter register 58 is connected to inputs of the masking comparator 60 and of the adder node 62. The masking comparator 60 receives on a further input a number of masking cycles $N_M$ (e.g., three) from a purposely provided programmable data register 63 and supplies on its output the second control signal $C_2$. In particular, the second control signal $C_2$ has the enabling value when the contents of the masking counter register 58 is equal to or higher than the number of masking cycles $N_M$, and the disabling value otherwise. The output of the masking comparator 60 is moreover connected to an input of the enabling gate 40 and to a control input of the third selector circuit 61. In turn, the third selector circuit 61 has data inputs connected to respective data registers 65, 66, in which the value "1" and the value "0" are stored, and an output connected to the adder node 62. The third selector circuit 61 is controlled by the masking comparator 60 by the second control signal $C_2$, so as to supply to the adder node 62 the value "0" and the value "1" when the second control signal $C_2$ has the enabling value and, respectively, the disabling value.

In practice, when the step-detection signal DET switches to the detection value, the masking counter register 58 is reset, and the second control signal $C_2$ assumes the disabling value, preventing the detection and counting of further steps. The masking counter register 58 is inserted in a counting loop, together with the adder node 62, and is incremented at each cycle by the clock signal CK until the second control signal $C_2$ maintains the disabling value (the adder node receives the value "1" from the third selector circuit 61 and adds it to the value on the output of the masking counter register 58). When the content of the masking counter register 58 reaches the number of masking cycles $N_M$, the second control signal $C_2$ returns to the disabling value and the detection of the steps is again enabled. Furthermore, the third selector circuit 61 is controlled so as to supply the value "0" to the adder node 62, and hence the contents of the masking counter register 58 remains constant, not being further incremented. Consequently, the masking circuit 41 is triggered whenever a step of the user is detected and inhibits detection of further steps for a time interval equal to $N_M$ cycles of the clock signal.

Figure 12:
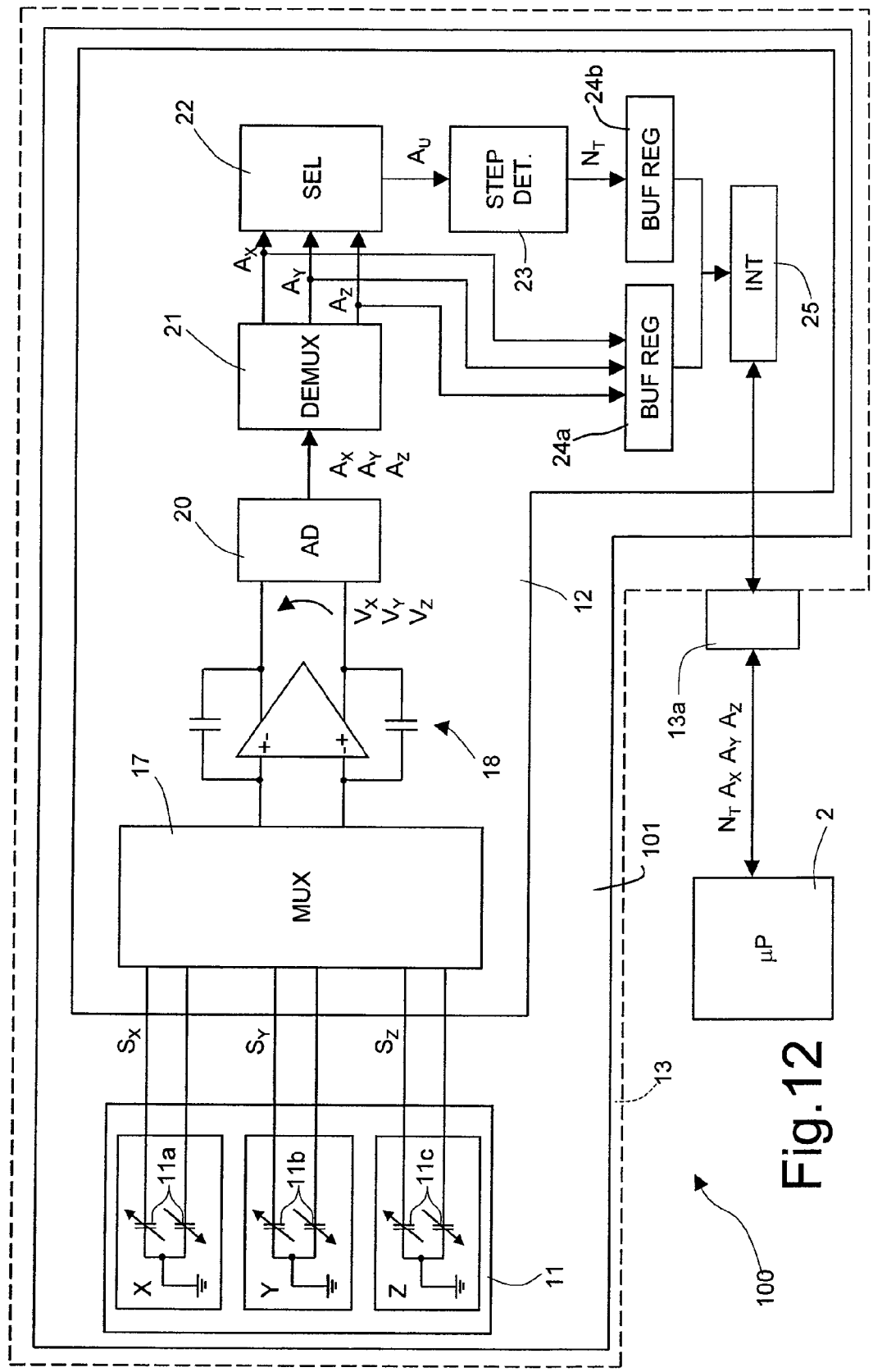
FIG. 12 is a simplified block diagram of an inertial device built in accordance with a second embodiment of the present invention.

According to a different embodiment of the invention, illustrated in FIG. 12, in which parts that have already been illustrated are designated by the same reference numbers, in a pedometer 100 the inertial sensor 11 and the processing unit 12 are provided in a single semiconductor chip 101, in addition to being both encapsulated within the same package 13.

The inertial device has the advantage of being immediately integratable in a generic portable electronic appliance, such as a cell phone or a palmtop, without occupying the computation resources available to the portable electronic appliance itself. In particular, the microprocessor (or other independent control unit of the portable electronic appliance) does not need to undertake any type of supplementary processing, because the number of steps counted can be directly detected by the pedometer. There are thus prevented both slowing-down in the execution of the functions associated to the portable electronic appliance and errors in counting of the steps on account of possible conflicts and temporary interruptions of the necessary control functions.

Finally, it is evident that modifications and variations may be made to the inertial device and to the portable electronic appliance described herein, without departing from the scope of the present invention as defined in the annexed claims. In particular, the pedometer could integrate further functions in addition to the ones described and carry out counting of the steps in a way that is at least in part different. Furthermore, it is evident that the circuits that implement the various control functions (detection, counting, threshold adaptation, masking etc.) may have a structure different from the one described and be made up of equivalent alternative solutions.

The invention claimed is:

1. An inertial device comprising:
   an inertial sensor configured to generate at least one raw acceleration signal in response to accelerations produced when a user of the inertial device walks;
   a processing unit associated with said inertial sensor, said processing unit arranged to count a number of steps of the user on the basis of the raw acceleration signal; and
   a single integrated circuit package encapsulating both the inertial sensor and the processing unit, said single integrated circuit package having an array of electrical conductors wherein said array of electrical conductors is configured to mount to a component having a matching array pattern.

2. The inertial device according to claim 1 wherein said array of electrical conductors is formed as one of a ball grid array or a land grid array.

3. The inertial device according to claim 1 wherein the component is a circuit board.

4. The inertial device according to claim 1 wherein at least one conductor of said array of electrical conductors is configurable to pass the number of steps.

5. The inertial device according to claim 1 wherein said processing unit comprises a conversion chain configured to extract a usable acceleration signal from said raw acceleration signal.

6. The inertial device according to claim 1 wherein said inertial sensor is a capacitive microelectromechanical sensor having at least three mutually independent axes, the inertial sensor configured to supply at least three raw acceleration signals in response to accelerations caused by movements of walking of the user.

7. The inertial device according to claim 5 wherein a detection circuit comprises:
   a counter register, configured to store the number of steps;

a first comparator, configured to compare the usable acceleration signal with a threshold value, said first comparator coupled to said counter register, said first comparator configured to update the number of steps in response to the usable acceleration signal exceeding the threshold value; and a selective-enabling circuit configured to enable updating the number of steps when the usable acceleration signal is lower than the threshold value, said selective-enabling circuit further configured to disable the updating the number of steps for a determined time interval after the usable acceleration signal has exceeded the threshold value.

8. The inertial device according to claim 7 wherein said time interval is programmable.

9. The inertial device according to claim 7 wherein said detection circuit includes a threshold-updating circuit configured to generate the threshold value based on the usable acceleration signal.

10. The inertial device according to claim 7 wherein said inertial sensor is formed in a first semiconductor chip and said processing unit is formed in a second semiconductor chip, said first semiconductor chip being separate from said second semiconductor chip.

11. The inertial device according to claim 7 wherein said inertial sensor and said processing unit are both formed on a single semiconductor chip.

12. A portable electronic device, comprising:
a printed circuit board having an array of electrically conductive pads wherein said array of electrically conductive pads is configured for connection to a package having a matching array pattern; and
an inertial device formed in a single integrated circuit package, the inertial device coupled to the printed circuit board via the array of electrically conductive pads, the inertial device encapsulating:
an inertial sensor structured to generate at least one raw acceleration signal in response to accelerations produced when a user of the portable electronic device walks; and
a processing unit, associated with said inertial sensor, said processing unit structured to count a number of steps of the user on the basis of said raw acceleration signal.

13. The portable electronic device according to claim 12 wherein said inertial device includes an array of electrical conductors formed as a ball grid array or a land grid array.

14. The portable electronic device according to claim 12 wherein at least one pad of said array of electrically conductive pads is configurable to pass the number of steps.

15. The portable electronic device according to claim 12, further comprising:
a control unit coupled to the printed circuit board, said control unit being separate from said processing unit of said inertial device, said control unit structured to receive the number of steps.

16. The portable electronic device according to claim 12 wherein a communication interface is configurable to pass the number of steps.

17. A method of operating a portable electronic appliance, comprising:
controlling operations of the portable electronic appliance with a control unit;
generating a number of steps with an inertial device, the inertial device having an inertial sensor and a processing unit encapsulated in a single integrated circuit package, said generating including:
producing, by the inertial sensor, an acceleration signal in response to accelerations caused by movements of a user; and
counting, with the processing unit, the number of steps of the user based on the acceleration signal; and
electrically passing the number of steps from the inertial device to the control unit.

18. The method according to claim 17 wherein the generating further includes:
comparing the acceleration signal with a threshold value;
incrementing the number of steps in response to the acceleration signal exceeding the threshold value; and
storing the number of steps in a counter register.

19. The method according to claim 18 wherein the generating further includes:
selectively enabling the incrementing the number of steps when the acceleration signal is lower than the threshold value and further selectively disabling the incrementing the number of steps for a determined time interval after the acceleration signal has exceeded the threshold value.

20. The method according to claim 19 wherein the generating further includes:
setting the determined time.

* * * * *